(12) United States Patent
Mitrovic et al.

(10) Patent No.: US 11,904,555 B2
(45) Date of Patent: Feb. 20, 2024

(54) INDUCTION WELDING OF THERMOPLASTIC WITH METALLIC STRIPS

(71) Applicant: ROHR, INC., Chula Vista, CA (US)

(72) Inventors: Milan Mitrovic, Del Mar, CA (US); Jonathan S. Huang, Pasadena, CA (US); Michael Van Tooren, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 17/567,750

(22) Filed: Jan. 3, 2022

(65) Prior Publication Data
US 2023/0211569 A1 Jul. 6, 2023

(51) Int. Cl.
*B29C 65/36* (2006.01)
*B29C 65/46* (2006.01)
*B29C 65/00* (2006.01)
*B29L 31/30* (2006.01)

(52) U.S. Cl.
CPC ...... *B29C 65/3644* (2013.01); *B29C 65/3676* (2013.01); *B29C 65/46* (2013.01); *B29C 66/131* (2013.01); *B29C 66/7392* (2013.01); *B29C 66/742* (2013.01); *B29L 2031/3076* (2013.01)

(58) Field of Classification Search
CPC .............. B29C 66/742; B29C 66/7392; B29C 65/3644; B29C 65/3676; B29C 65/46
See application file for complete search history.

(56) References Cited

U.S. PATENT DOCUMENTS

| 4,836,691 | A | * | 6/1989 | Suzuki | ................ B29C 66/1122 493/929 |
| 5,500,511 | A | * | 3/1996 | Hansen | ............... B29C 66/3472 156/272.4 |
| 5,705,795 | A |   | 1/1998 | Anderson et al. | |
| 5,717,191 | A |   | 2/1998 | Christensen et al. | |
| 6,602,810 | B1 |   | 8/2003 | Christensen et al. | |

(Continued)

FOREIGN PATENT DOCUMENTS

| DE | 102019125250 | | 3/2021 | |
| EP | 3772402 A1 | * | 2/2021 | ............. B23K 13/01 |
| WO | 20210006725 | | 1/2021 | |

OTHER PUBLICATIONS

European Patent Office, European Search Report dated Jun. 20, 2023 in Application No. 23150203.0.

*Primary Examiner* — Daniel McNally
(74) *Attorney, Agent, or Firm* — SNELL & WILMER L.L.P.

(57) ABSTRACT

Methods and apparatus' for induction welding a first workpiece to a second workpiece at a welding region may include a metallic strip. The metallic strip may be a mesh. The properties of the metallic strip, such as, for example, pore size, thickness, and density, may be configured to conduct heat uniformly across the welding region and prevent eddy current formation across a workpiece. The metallic strip may be embedded in a workpiece or may be fixed to an induction welding tool that acts on the welding region during induction welding. A removable polymer tape may be disposed between a workpiece and a metallic strip fixed to an induction welding tool. The workpieces may be thermoplastic composite structures and thermoplastic composite stiffeners in aircraft structures.

19 Claims, 9 Drawing Sheets

(56) References Cited

U.S. PATENT DOCUMENTS

| | | | |
|---|---|---|---|
| 7,012,227 B2* | 3/2006 | Tathgur | F16L 47/03 |
| | | | 219/610 |
| 2002/0113066 A1* | 8/2002 | Stark | B29C 65/3696 |
| | | | 219/634 |
| 2013/0149501 A1 | 6/2013 | Pacchione et al. | |
| 2017/0129163 A1* | 5/2017 | Soccard | B29C 66/3472 |

* cited by examiner

INDUCTION WELDING OF THERMOPLASTIC WITH METALLIC STRIPS

FIELD

The present disclosure relates generally to induction welding of thermoplastic composite structures, and more specifically to systems and methods for induction welding a stiffener to a thermoplastic composite structure using a metallic strip.

BACKGROUND

Many aircraft thermoplastic composite structures are formed using stiffeners or substructures to reinforce or "stiffen" the structure. These stiffeners typically provide the structure with resistance to compression buckling or bending, making the structure desirably less flexible in response to shearing, tensile, or compressive stress, or the like. These stiffeners may be joined to the thermoplastic structure by induction welding. Induction welding utilizes electromagnetic induction to heat a workpiece. An induction coil is energized with an alternating electric current which generates an electromagnetic field that heats a workpiece and binds it to a thermoplastic structure. As a stiffener is laid up in a thermoplastic structure, induction welding can generate eddy currents which may heat the edges of the stiffener and thermoplastic structure at higher than desirable temperatures, which may damage the thermoplastic structure.

SUMMARY

A method of joining a first workpiece to a second workpiece is disclosed herein. In various embodiments, the method may comprise induction welding the first workpiece to the second workpiece. In various embodiments, the second workpiece may at least partially overlay the first workpiece. In various embodiments, the second workpiece may comprise an embedded metallic strip at a welding region. In various embodiments, the induction welding may occur at a welding region.

In various embodiments, the induction welding may further comprise operating an induction welding tool at the welding region. In various embodiments, the tool may comprise an induction welding tool surface. In various embodiments, the induction welding tool surface may be located proximate the second workpiece. In various embodiments, the induction welding may further comprise energizing a coil located proximate the first workpiece. The coil may be configured to energize with an electric current. In various embodiments, the energized coil may be configured to generate an electromagnetic field. The electromagnetic field may be configured to induce a current which heats the first workpiece and the second workpiece at the welding region. The heat generated by the coil may be configured to weld, by the induction welding tool, the second workpiece to the first workpiece at the welding region.

In various embodiments, the induction welding may further comprise induction welding a thermoplastic composite structure to the second workpiece. In various embodiments, the thermoplastic composite structure may comprise a skin. In various embodiments, the skin may be configured to weld to the second workpiece.

In various embodiments, induction welding the thermoplastic composite structure to the second workpiece may further comprise induction welding the thermoplastic composite structure to a stiffener. In various embodiments, induction welding the thermoplastic composite structure to the stiffener further comprises the stiffener comprising a stiffener cap. The stiffener may further comprise a stiffener web. In various embodiments, the stiffener may comprise a stiffener flange. In various embodiments, the stiffener flange may be configured to weld to the thermoplastic composite structure.

In various embodiments, induction welding the stiffener flange to the thermoplastic composite structure further comprises the stiffener flange at least partially overlaying the skin of the thermoplastic composite structure. In various embodiments, the stiffener flange may be configured to weld to the skin of the thermoplastic composite structure at the welding region. In various embodiments, induction welding the stiffener flange to the skin may further comprise energizing the coil. In various embodiments, the energized coil may be configured to generate the electromagnetic field. In various embodiments, the electromagnetic field may be configured to induce an electric current which heats the stiffener flange and the skin at the welding region. In various embodiments, the heat generated by the coil may be configured to weld, by the induction welding tool, the stiffener flange to the skin at the welding region. In various embodiments, induction welding the stiffener flange to the skin may further comprise the stiffener flange comprising the embedded metallic strip at the welding region.

A method of joining a first workpiece to a second workpiece is also disclosed herein. In various embodiments, the method may comprise induction welding the first workpiece to the second workpiece. In various embodiments, the second workpiece may at least partially overlay the first workpiece. In various embodiments, a polymer tape may at least partially overlay the second workpiece. In various embodiments, the polymer tape may be disposed between the second workpiece and a metallic strip. In various embodiments, the welding may occur at a welding region.

In various embodiments, the induction welding may further comprise operating an induction welding tool at the welding region. In various embodiments, the tool may comprise an induction welding tool surface. In various embodiments, the induction welding tool surface may be located proximate the second workpiece. In various embodiments, the induction welding may further comprise energizing a coil located proximate the first workpiece. The coil may be configured to energize with an electric current. In various embodiments, the energized coil may be configured to generate an electromagnetic field. The electromagnetic field may be configured to induce a current which heats the first workpiece and the second workpiece at the welding region. The heat generated by the coil may be configured to weld, by the induction welding tool, the second workpiece to the first workpiece at the welding region. In various embodiments, the metallic strip may be configured to conduct the heat generated by the coil uniformly across the welding region. In various embodiments, the method may further comprise removing the polymer tape from the second workpiece after induction welding.

In various embodiments, induction welding the first workpiece to the second workpiece may further comprise induction welding a thermoplastic composite structure to the second workpiece. In various embodiments, the thermoplastic composite structure may comprise a skin. In various embodiments, the skin may be configured to weld to the second workpiece.

In various embodiments, induction welding the thermoplastic composite structure to the second workpiece may further comprise induction welding the thermoplastic composite structure to a stiffener. In various embodiments, induction welding the thermoplastic composite structure to the stiffener further comprises the stiffener comprising a stiffener cap. The stiffener may further comprise a stiffener web. In various embodiments, the stiffener may comprise a stiffener flange. In various embodiments, the stiffener flange may be configured to weld to the thermoplastic composite structure.

In various embodiments, induction welding the stiffener flange to the thermoplastic composite structure further comprises the stiffener flange at least partially overlaying the skin of the thermoplastic composite structure. In various embodiments, the stiffener flange may be configured to weld to the skin of the thermoplastic composite structure at the welding region.

In various embodiments, induction welding the stiffener flange to the skin at the welding region may further comprise disposing the polymer tape at the welding region. In various embodiments, the polymer tape may at least partially overlay the stiffener flange. In various embodiments, induction welding the stiffener flange to the skin may further comprise energizing the coil. In various embodiments, the energized coil may be configured to generate the electromagnetic field. In various embodiments, the electromagnetic field may be configured to induce a current which heats the stiffener flange and the skin at the welding region. In various embodiments, the heat generated by the coil may be configured to weld, by the induction welding tool, the stiffener flange to the skin at the welding region.

In various embodiments, induction welding the stiffener flange to the skin at the welding region may further comprise the metallic strip. In various embodiments, the metallic strip may be a mesh fixed to the induction welding tool surface.

In various embodiments, induction welding the stiffener flange to the skin at the welding region may further comprise the polymer tape. In various embodiments, the polymer tape may be disposed between the stiffener flange and the metallic stip. In various embodiments, the polymer tape may be configured to be removed from the stiffener flange after induction welding.

An induction welding apparatus is also disclosed herein. In various embodiments, the apparatus may comprise a first workpiece, a second workpiece, an induction welding tool, and a coil. In various embodiments, the second workpiece may comprise an embedded metallic strip at a welding region. In various embodiments, the metallic strip may be a mesh. In various embodiments, the induction welding tool may comprise an induction welding tool surface. In various embodiments, the induction welding tool surface may be located proximate the second workpiece. In various embodiments, the coil may be located proximate the first workpiece. In various embodiments, the coil may be configured to energize with an electric current. In various embodiments, the energized coil may be configured to generate an electromagnetic field. In various embodiments, the electromagnetic field may be configured to induce a current which heats the first workpiece and the second workpiece at the welding region. In various embodiments, the heat generated by the coil may be configured to weld, by the induction welding tool, the second workpiece to the first workpiece at the welding region.

In various embodiments, the first workpiece may be a thermoplastic composite structure. In various embodiments, the thermoplastic composite structure may be configured to weld to the second workpiece. In various embodiments, the thermoplastic composite structure may comprise a skin. In various embodiments, the second workpiece may be a stiffener. In various embodiments, the stiffener may comprise a stiffener cap. The stiffener may further comprise a stiffener web. In various embodiments, the stiffener may comprise a stiffener flange. In various embodiments, the stiffener flange may at least partially overlay the skin of the thermoplastic composite structure. In various embodiments, the stiffener flange may be configured to comprise the embedded mesh at the welding region.

In various embodiments, the heat generated by the coil may be configured to weld, by the induction welding tool, the stiffener flange to the skin of the thermoplastic composite structure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
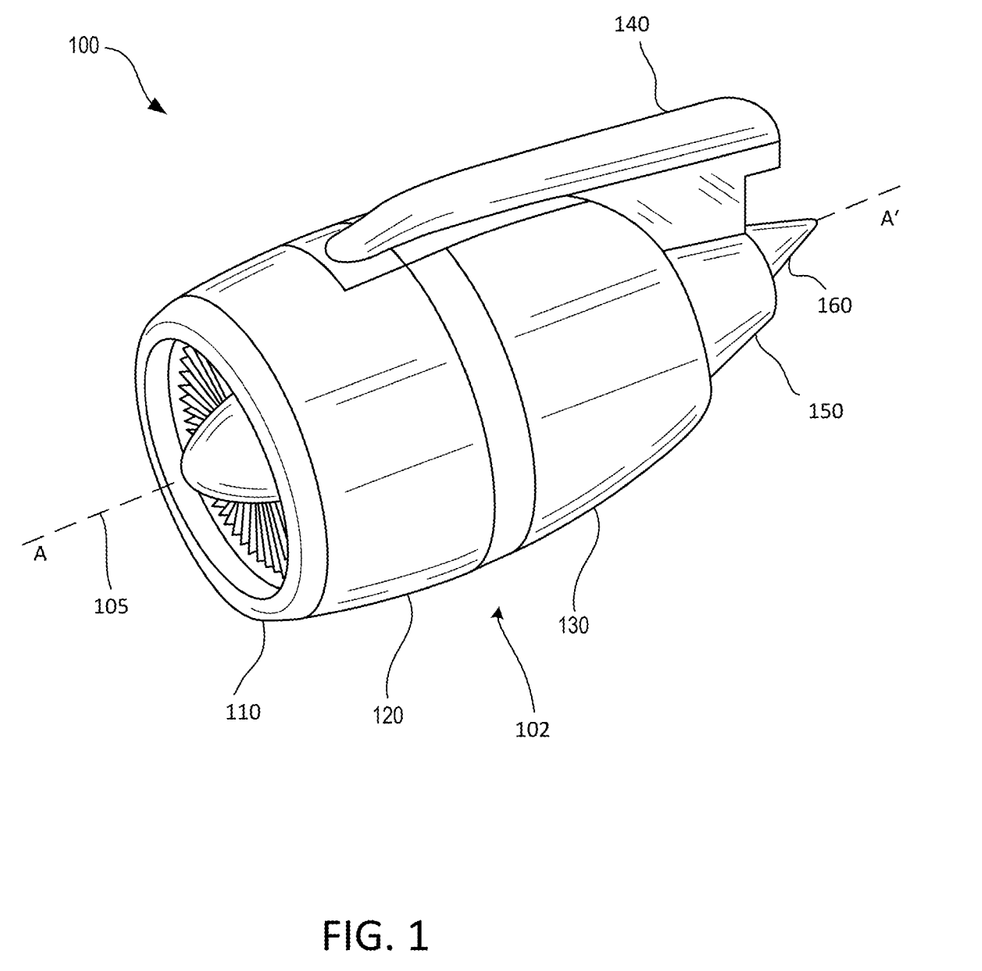
FIG. 1 illustrates an aircraft turbine engine, in accordance with various embodiments.

FIG. 1 illustrates a nacelle 100 for a gas turbine engine according to various embodiments. The nacelle for a gas turbine engine may be suitable for an aircraft. The nacelle 100 may comprise a centerline A-A' 105. Nacelle 100 may comprise an inlet 110, a fan cowl 120, and a thrust reverser 130. The fan cowl 120 may comprise a stiffener 102 configured to reinforce the fan cowl 120. Nacelle 100 may be coupled to a pylon 140, which may mount the nacelle 100 to an aircraft wing or aircraft body. A nozzle 150 may surround a center body 160, between which an engine exhaust stream exits to provide additional thrust.

Figure 2:
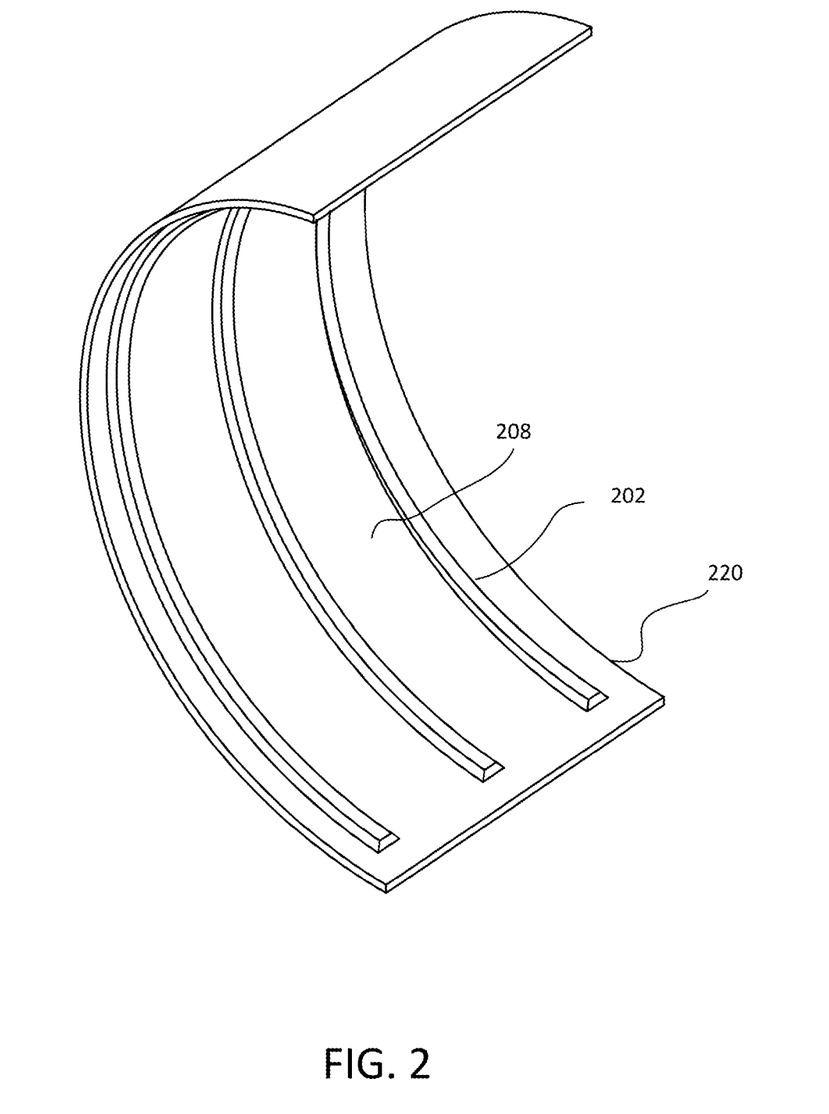
FIG. 2 illustrates a portion of an aircraft fan cowl having a stiffener, in accordance with various embodiments.

Referring to FIG. 2, a portion of an aircraft fan cowl 220 is illustrated according to various embodiments. In various embodiments, the fan cowl 220 may be comprised of a metal material, a thermoplastic, a thermoplastic composite material, or the like. In various embodiments, the fan cowl 220 may be a thermoplastic composite structure. In such embodiments, the fan cowl 220 may include at least one stiffener 202 formed along an inner surface or skin 208 of the fan cowl 220. The stiffener 202 may be formed along the skin 208 according to any desirable orientation, geometry, or symmetry, including, for example, a fully interconnected grid stiffening symmetry. A stiffener 202 in a fan cowl 220 is described, however, a stiffener 202 may be utilized in any other suitable aircraft structure, including for example, a fuselage, a wing, panels, and substructures thereof, and the like. In various embodiments, stiffeners as disclosed herein may be comprised of a thermoplastic, a thermoplastic composite, a metallic material, or the like. Stiffener 202 comprises a thermoplastic composite material.

Figure 3A:
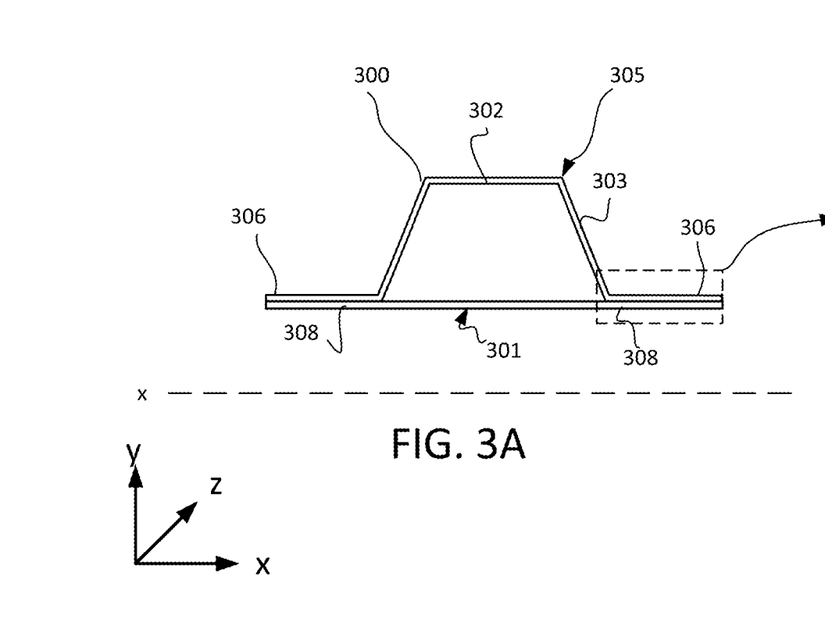
FIG. 3A illustrates a cross-section view of a first workpiece at least partially overlayed by a second workpiece along an x-x axis, specifically a thermoplastic skin at least partially overlayed by a stiffener, in accordance with various embodiments.
Figure 3B:
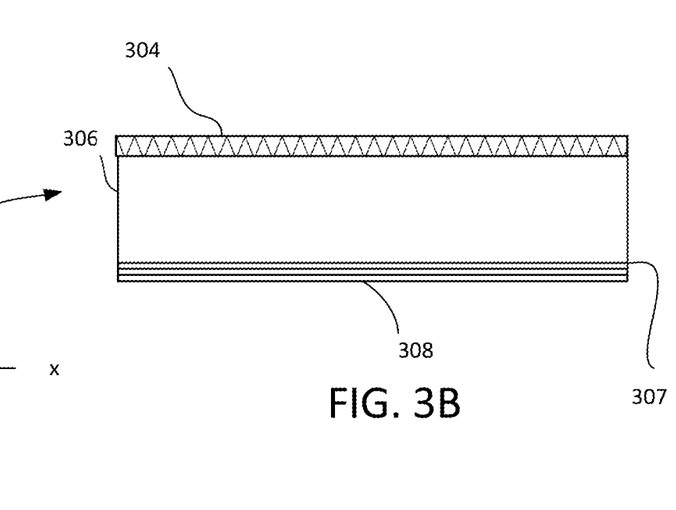
FIG. 3B illustrates a cross-section view of a flange of the stiffener at least partially overlaying a thermoplastic skin, in accordance with various embodiments.
Figure 8A:
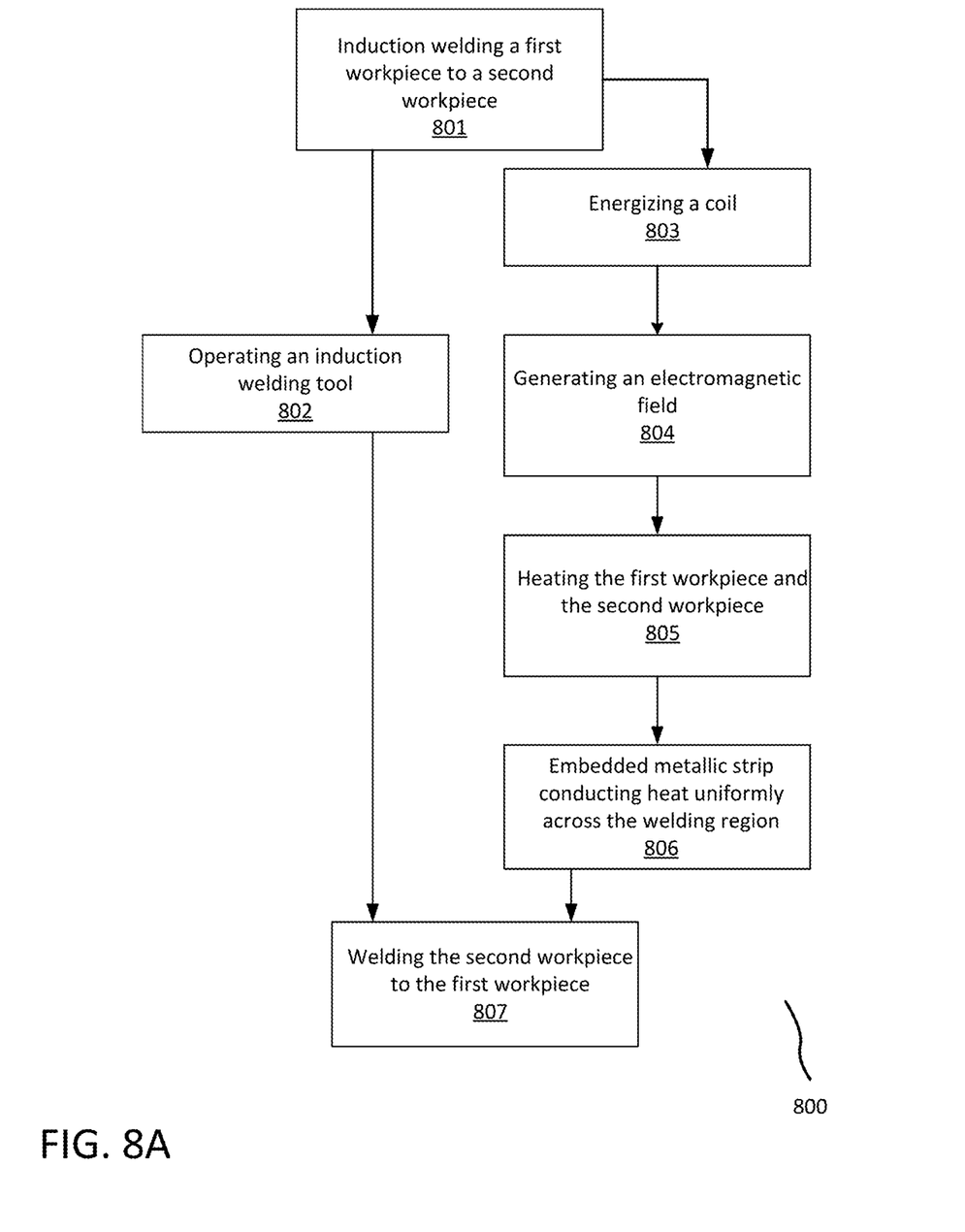
FIG. 8A illustrates a method of joining a first workpiece to a second workpiece, in accordance with various embodiments.
Figure 8B:
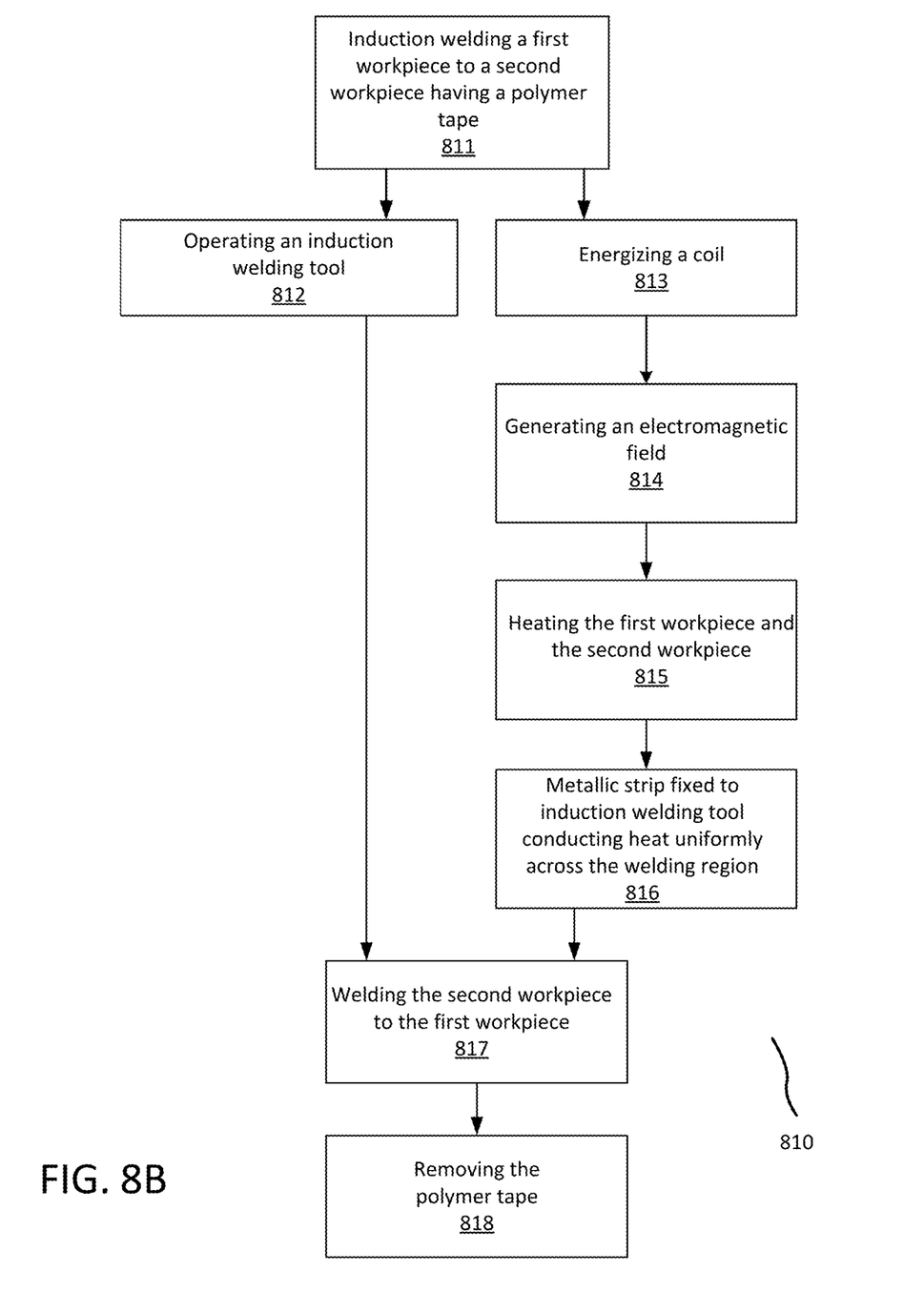
FIG. 8B illustrates a method of joining a first workpiece to a second workpiece, in accordance with various embodiments.

FIG. 3A illustrates a cross-section of a first workpiece 301 at least partially overlayed by a second workpiece 305 along an x-x axis in accordance with various embodiments. In various embodiments, and with additional reference to FIG. 8A, a method (step 800) of joining the first workpiece 301 to the second workpiece 305 may comprise induction welding (step 801) the second workpiece 305 to the first workpiece 301. In various embodiments, the first workpiece 301 may be a thermoplastic composite structure comprising a thermoplastic composite skin 308 and the second workpiece 305 may be a stiffener 300. In various embodiments, stiffeners as disclosed herein may be comprised of a thermoplastic, a thermoplastic composite, a metallic material, or the like. Stiffener 300 comprises a thermoplastic composite material. In various embodiments, the stiffener 300 may overlay or at least partially overlay the skin 308. In various embodiments, the stiffener 300 may comprise a stiffener cap 302, a stiffener web 303, and a stiffener flange 306. The stiffener web 303 may be offset from the skin 308, for example, at a substantially 45-degree angle. In various embodiments, the stiffener web 303 may be offset from the skin 308 at any desirable angle, or any angle suitable for reinforcing a thermoplastic composite structure. Referring to FIG. 3B, a cross-section of the stiffener flange 306 at least partially overlaying the skin 308 is shown according to various embodiments. In various embodiments, the stiffener flange 306 may be welded to the skin 308 at a welding region 307.

In continued reference to FIGS. 3A and 3B, welding may involve induction welding the stiffener 300 to the skin 308 at the welding region 307. Induction welding may generate heat that enables the skin 308 to bond to the stiffener 300. In various embodiments, the skin 308 may comprise a thermoplastic material, a thermoplastic composite material, or the like. Examples of thermoplastic composite materials for the stiffener 300 and skin 308 may include fiberglass, carbon fiber, aramid fiber, fiber-reinforced matrix systems, and the like. In various embodiments, the stiffener may comprise a metallic material. Examples of metallic materials for the stiffener 300 may include aluminum, aluminum alloys, iron alloys (e.g., various steel alloys) and the like.

Figure 4:
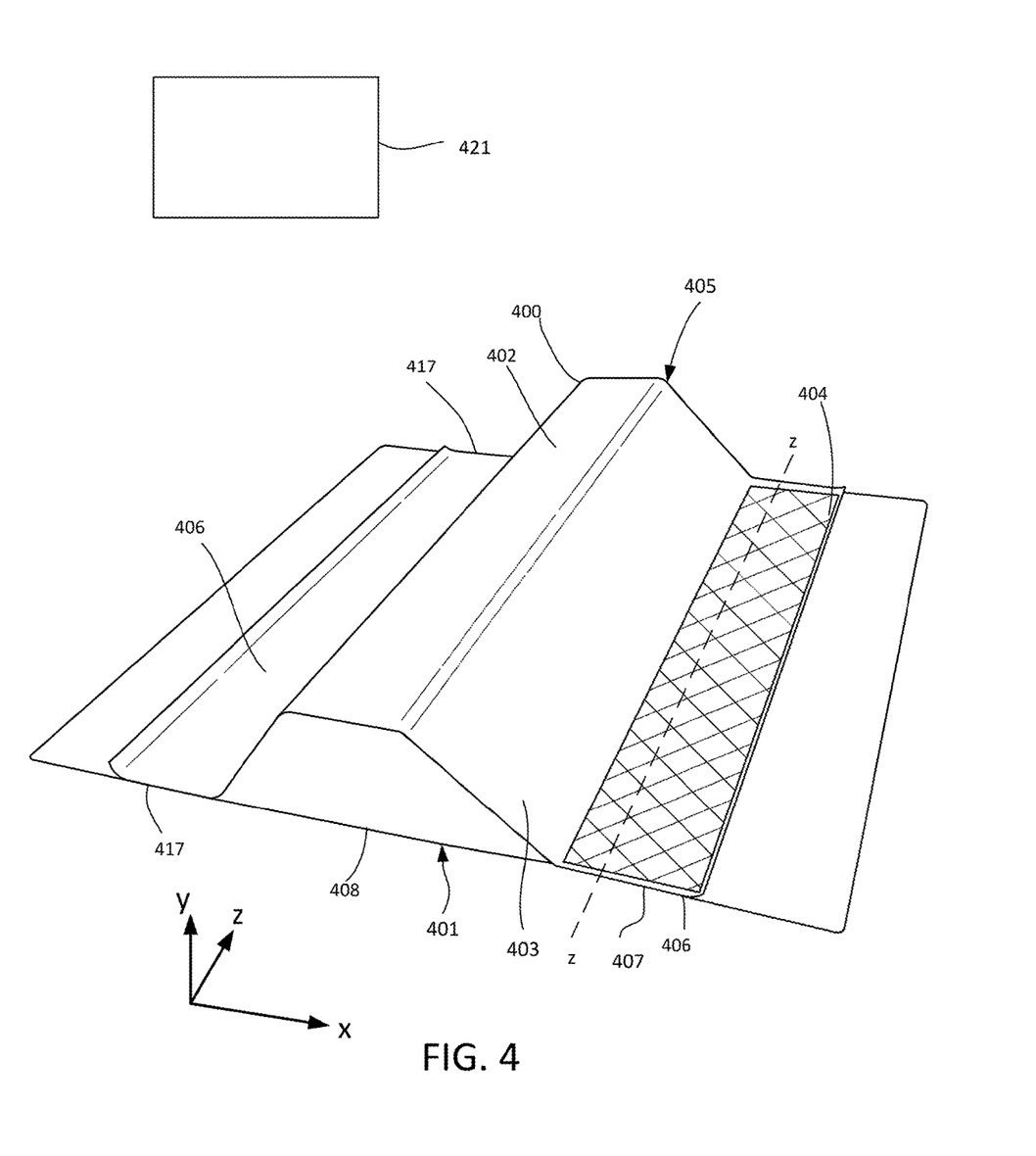
FIG. 4 illustrates an offset view of a stiffener at least partially overlaying a thermoplastic skin and a metal mesh at least partially overlaying a flange of the stiffener, in accordance with various embodiments.

In various embodiments, and with additional reference to FIG. 4, a thermoplastic composite skin 408 may tend to degrade as the heat generated by induction welding reaches the edges 417 of a stiffener 400. This may be caused by inconsistent eddy currents generated along the skin 308, as well as inconsistent heat generation at the welding region 307. For example, in various embodiments, the skin 408 and stiffener 400 may comprise at least one thermoplastic composite ply. In various embodiments, the thickness of the skin 408 and stiffener 400 may vary, for example, between 0.01 inches (0.254 millimeters) to 0.1 inches (2.54 millimeters) in various embodiments, 0.015 inches (0.381 millimeters) to 0.08 inches (2.032 millimeters) in various embodiments, 0.02 inches (0.508 millimeters) to 0.04 inches (1.016 millimeters) in various embodiments, and 0.02 inches (0.508 millimeters) to 0.022 inches (0.5588 millimeters) in various embodiments. Stiffeners as disclosed herein may be comprised of a thermoplastic, a thermoplastic composite, a metallic material, or the like. Stiffener 400 comprises a thermoplastic composite material.

The composite skin 408 and stiffener 400, and associated thickness, may determine the amount of heat associated with joining the skin 408 to the stiffener 400 using induction welding. Accordingly, every skin 408/stiffener 400 configuration requires careful selection of an applied induction welding current, as well as adjustments to welding speed. Thus, the lack of uniform skin 408/stiffener 400 thickness and undesirable eddy current generation may result in inconsistent heat generation, increased processing time to modify the induction welding process, and an increased risk of skin 408 and/or stiffener 400 degradation.

Accordingly, in various embodiments, and in further reference to FIG. 4, the method of joining a first workpiece 401 to a second workpiece 405 includes a second workpiece 405 having an embedded metallic strip 404 at the welding region 407. In various embodiments, the metallic strip 404 may be configured to conduct (step 806) heat uniformly across the welding region 407 during induction welding. Accordingly, the metallic strip 404 may enable faster and more controlled processing time for a given induction welding process. In various embodiments, the metallic strip 404 may prevent eddy current generation in the thermoplastic composite skin 408. The temperature of the induction weld may be governed by the properties of the metallic strip 404, such as, for example, the density of the metallic strip 404. In various embodiments, the metallic strip 404 may be a continuous surface 421 (i.e., solid sheet). In various embodiments, the metallic strip 404 may be a mesh (i.e., grating), and the like. In various embodiments, the mesh 404 may interfere with electromagnetic fields across the mesh and prevent a magnetic flux across its surface. This may be a function of the size of the mesh pores, the wavelength of the electromagnetic wave, and the conductivity of the mesh.

In various embodiments where the second workpiece 405 is a thermoplastic composite stiffener 400 and the first workpiece 401 is a thermoplastic composite skin 408, the metallic strip 404 may be configured to conduct heat uniformly along the z-z axis of the stiffener flange 406 during the induction welding process. Unlike the skin 408/stiffener 400 combination, which may have varied thickness and electrical conductivity properties that complicate the induction welding process and increases processing time, the mesh 404 may comprise a thickness tailored to the specific needs of an induction welding process. In various embodiments, the mesh 404 mesh may be tailored for a specific temperature delivery at the welding region 407.

Moreover, in various embodiments, the mesh 404 may be tailored based on conductivity and pore size. Pore geometry in a mesh 404 may be of any suitable geometry, such as, for example, a square, rectangle, circle, parallelogram, rhombus, and the like. The pore size may be tailored to be, at least, smaller than the wavelength of a given electromagnetic wave used in the induction welding process. A benefit of using the mesh 404 to join the stiffener 400 to the skin 408 using induction welding is that a weld temperature will depend on the electrical conductivity properties, such as the thickness and pore size of the mesh 404, rather than the properties of the thermoplastic composite skin 408 or stiffener 400. Accordingly, the mesh 404 may be configured to shield the skin 408 from electromagnetic waves and prevent eddy current formation along the skin 408. In various embodiments, the mesh 404 may comprise any conductive metallic material. In various embodiments, the mesh 404 may comprise copper, aluminum, gold, silver, and the like.

Figure 5:
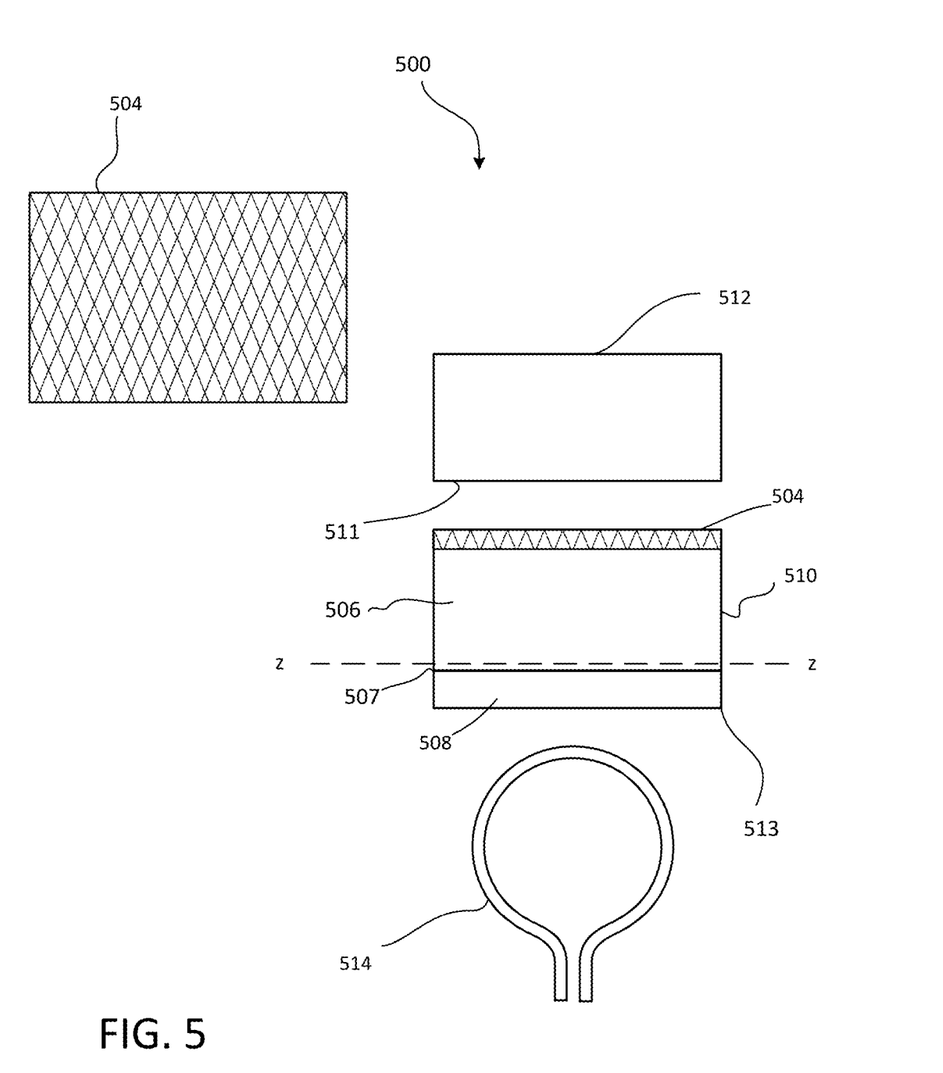
FIG. 5 illustrates a cross-section view of an induction welding system having a metal mesh at least partially overlaying a stiffener, in accordance with various embodiments.

In various embodiments, and with further reference to FIG. 5, the mesh 504 may be configured to embed in the stiffener flange 506 at a surface of the flange 506 that is distal to the welding region 507. Accordingly, and in various embodiments, the stiffener flange 506 may be prefabricated with the mesh 504 prior to induction welding. Moreover, embedding the mesh 504 at a surface of the flange 506 that is distal to the welding region 507 may prevent the mesh 504 from becoming a structural component of the bonded materials.

With reference to FIG. 5, a cross-section of an induction welding apparatus 500 is shown. In various embodiments, the induction welding apparatus 500 may comprise an induction welding tool 512. The induction welding tool 512 may have an induction welding tool surface 511 configured to operate (step 802) on at least one workpiece. As shown, the apparatus 500 may further comprise a first workpiece 513 and a second workpiece 510. In various embodiments, the first workpiece 513 may be a thermoplastic composite structure. In various embodiments, the second workpiece 510 may be a thermoplastic composite stiffener. In various embodiments, the stiffener may comprise an embedded metallic strip 504. In various embodiments, the metallic strip 504 may be a mesh. In various embodiments, the apparatus 500 may comprise a coil 514 located proximate the thermoplastic composite structure 513.

In various embodiments, the coil 514 may be configured to energize (step 803) with an electric current, for example, an alternating electric current. The energized coil 514 may be configured to generate (step 804) an electromagnetic field that induces a current which heats (step 805) the apparatus 500. In continued reference to FIG. 5 and with additional reference to FIG. 4, in various embodiments, the heat generated by the coil 514 may be configured to enable the induction welding tool 512 to weld (step 807) the stiffener 510 to the thermoplastic structure 513 along the z-z axis at a welding region 507.

In various embodiments, with continued reference to FIG. 5 and additional reference to FIG. 4, the thermoplastic composite structure 513 may comprise a skin 508. In various embodiments, the stiffener 510 may comprise a stiffener cap 402, a stiffener web 403, and, as shown in FIG. 5, a stiffener flange 506. Stiffeners as disclosed herein may be comprised of a thermoplastic, a thermoplastic composite, a metallic material, or the like. Stiffener 510 comprises a thermoplastic composite material. As shown in FIG. 5, the stiffener flange 506 may overlay or at least partially overlay the skin 508 of the thermoplastic composite structure 513. In various embodiments, the stiffener flange 506 may comprise an embedded mesh 504.

In various embodiments, the heat generated by the coil 514 may be configured to weld the stiffener flange 506 to the skin 508 of the thermoplastic structure 513. In various embodiments, the mesh 504 embedded in the stiffener flange 506 may be configured to conduct heat uniformly across the welding region 507.

Figure 6:
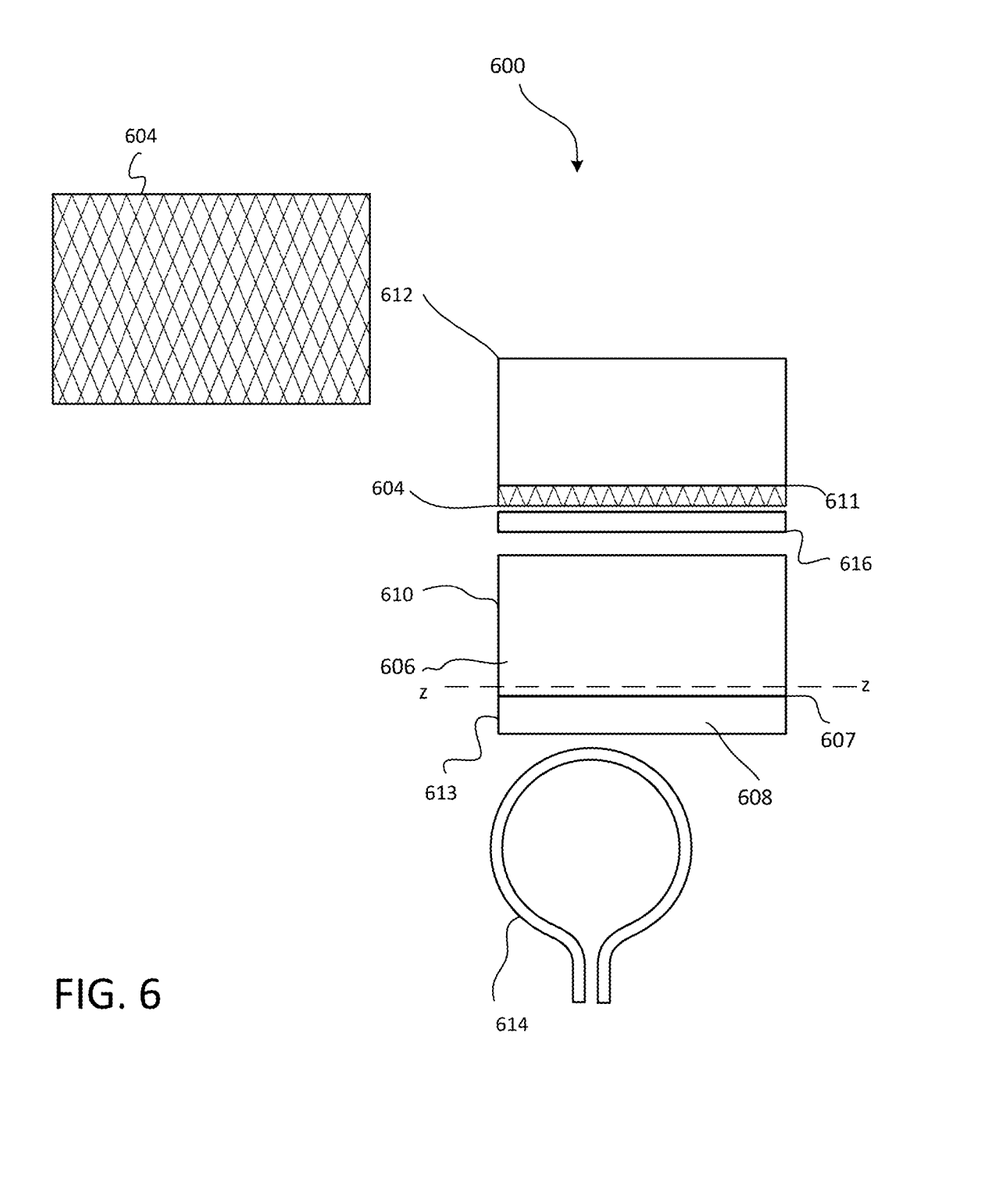
FIG. 6 illustrates a cross-section view of an induction welding system having a polymer material between a metal mesh and a stiffener, in accordance with various embodiments.
Figure 7:
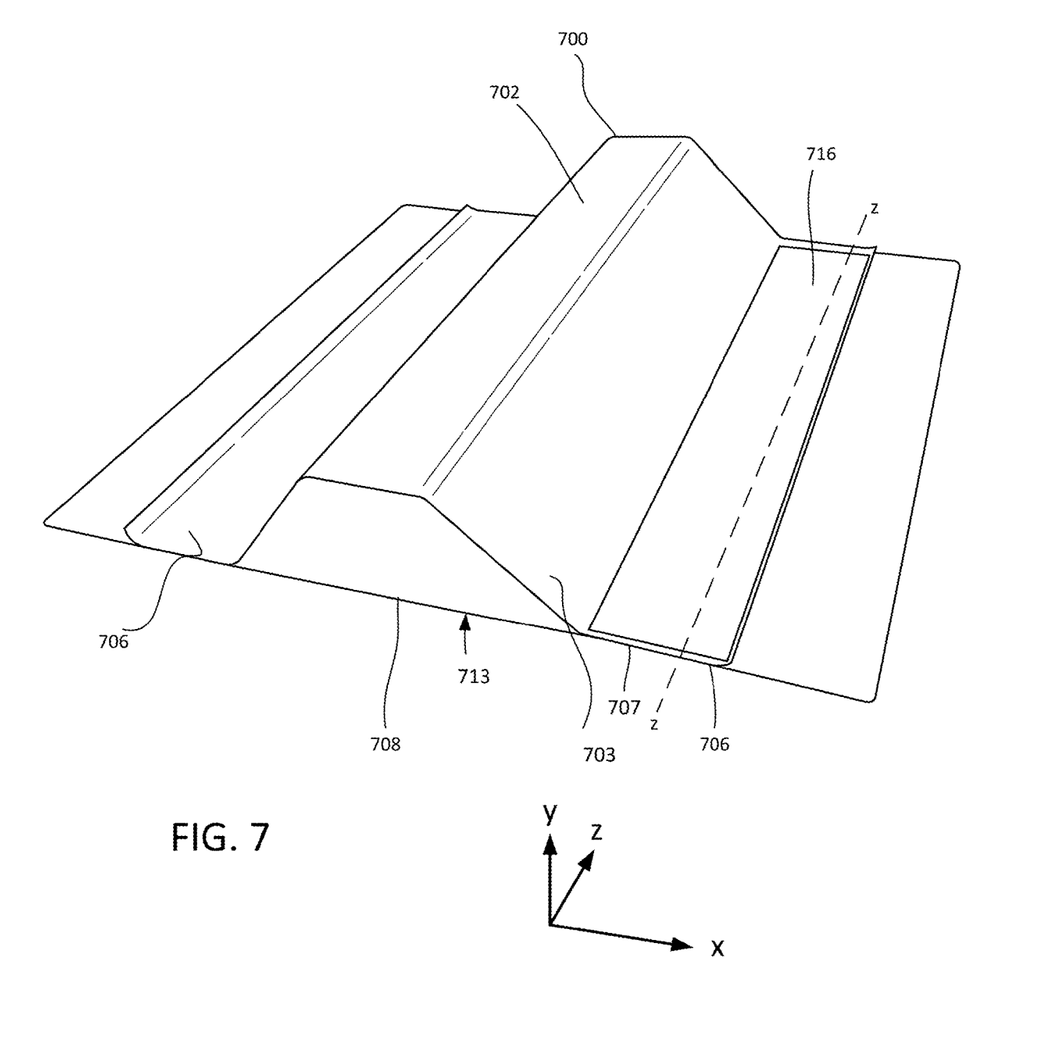
FIG. 7 illustrates an offset view of a stiffener at least partially overlaying a thermoplastic component and a metal mesh disposed within a flange of the stiffener, in accordance with various embodiments.

In various embodiments, and with reference to FIGS. 6 and 7, a method (810) of joining a first workpiece (613 and 713) to a second workpiece (610 and 700) is disclosed herein. In various embodiments, the method of joining the first workpiece (613 and 713) to the second workpiece (610 and 700) may comprise induction welding (step 811) the second workpiece (610 and 700) to the first workpiece (613 and 713). In various embodiments, the first workpiece may be a thermoplastic composite structure (613 and 713) comprising a thermoplastic composite skin (608 and 708) and the second workpiece may be a stiffener (610 and 700). Stiffeners as disclosed herein may be comprised of a thermoplastic, a thermoplastic composite, a metallic material, or the like. Stiffener (610 and 700) comprises a thermoplastic composite material. In various embodiments, the stiffener (610 and 700) may overlay or at least partially overlay the thermoplastic structure 613 and skin (608 and 708). In various embodiments, the stiffener (610 and 700) may comprise a stiffener cap 702, a stiffener web 703, and a stiffener flange (606 and 706). In various embodiments, the stiffener flange (606 and 706) may overlay or at least partially overlay the skin (608 and 708).

In continued reference to FIGS. 6 and 7, welding may involve induction welding the stiffener flange 606 to the skin 608 at the welding region 607 using an induction welding tool 612 located proximate the stiffener flange 606. The induction welding tool 612 may be configured to operate (step 812) on at least one workpiece. The induction welding tool 612 may have an induction welding tool surface 611.

Induction welding may generate heat that enables the skin 608 to weld to the stiffener flange 606. In various embodiments, a coil 614 located proximate the thermoplastic structure 613 may be configured to energize (step 813) with an electric current. The energized coil 614 may be configured to generate (step 814) an electromagnetic field and magnetic flux across the surface of the thermoplastic structure 613 and stiffener 610, inducing a current which heats (step 815) the thermoplastic structure 613 and the stiffener 610. In various embodiments, the heat generated by the coil 614 may be configured to enable the induction welding tool 612 to weld (step 817) the stiffener 610 to the thermoplastic structure 613 at a welding region 607.

In various embodiments, the method of joining the first workpiece (613 and 713) to the second workpiece (610 and 700) may further comprise a polymer tape (616 and 716) at least partially overlaying the second workpiece (610 and 700). In various embodiments, the polymer tape 616 may be disposed between the second workpiece 610 and a metallic strip 604. In various embodiments, the metallic strip 604 may be a mesh. In various embodiments, the mesh 604 may be fixed or otherwise coupled to the induction welding tool surface 611.

In various embodiments, the second workpiece is the stiffener (610 and 700) and the first workpiece is the thermoplastic structure (613 and 713) with skin (608 and 708). The polymer tape (616 and 716) may overlay or at least partially overlay the stiffener flange (606 and 706). Accordingly, the polymer tape 616 may be disposed between the stiffener flange 606 and the mesh 604. In various embodiments, the polymer tape (616 and 716) may be removable. In various embodiments, the method of joining the first workpiece (613 and 713) to the second workpiece (610 and 700) may further comprise removing (step 818) the polymer tape (616 and 716) from the welding region (607 and 707) after induction welding. In various embodiments, the polymer tape (616 and 716) may comprise any suitable polymer material that resists sticking upon heating, such as, for example, polytetrafluoroethylene (PTFE), polyoxymethylene, polychlorotrifluoroethylene (PCTFE), perfluoroalkoxy (PFA), tetrafluoroethylene-perfluoropropylene (FEP), and the like.

In various embodiments, the mesh 604 may be configured to conduct (step 816) heat uniformly across the welding region 607 during induction welding. Accordingly, the mesh 604 may enable faster and more controlled processing time for a given induction welding process. In various embodiments, the mesh 604 may prevent eddy current generation in the thermoplastic composite skin 608. Accordingly, the temperature of the induction weld may be governed by the properties of the mesh 604, such as, for example, the density and pore size of the mesh 604.

As applied to embodiments where the second workpiece (610 and 700) includes a stiffener flange (606 and 706), and the first workpiece (613 and 713) is a thermoplastic composite skin (608 and 708), the metallic strip 604 may be configured to conduct heat uniformly along the z-z axis of the stiffener flange (606 and 706) during the induction welding process. In various embodiments, the mesh 604 may be tailored based on conductivity. In various embodiments, the mesh 604 may comprise any conductive metallic material. In various embodiments, the mesh 604 may comprise copper. In various embodiments, the mesh 604 may be tailored for a specific temperature delivery at the welding region (607 and 707).

A benefit of using the mesh 604 to join the stiffener flange (606 and 706) to the skin (608 and 708) using induction welding is that a weld temperature will depend on the electrical conductivity properties, such as the thickness and pore size, of the mesh 604, rather than the properties of the thermoplastic composite skin (608 and 708) or stiffener flange (606 and 706). Accordingly, the mesh 604 may be configured to shield the skin (608 and 708) from electromagnetic waves and prevent eddy current formation along the skin 408.

Additionally, utilizing a removable polymer tape (616 and 716) between the mesh 604 and the second workpiece (610 and 700) prevents the mesh 604 from being welded into the structure of the second workpiece (610 and 700), and enables re-use of the mesh 604 on the induction tool surface 611 for successive welding operations.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of joining a first workpiece to a second workpiece, the method comprising:

induction welding the first workpiece to the second workpiece, wherein a first side of the second workpiece at least partially overlays a first side of the first workpiece, wherein the first workpiece is a first thermoplastic composite structure, wherein the second workpiece is a second thermoplastic composite structure, wherein the induction welding comprises:

locating a non-ferrous metallic strip proximate a second side of the second workpiece, wherein the non-ferrous metallic strip is configured to conduct heat uniformly at a welding region between the first side of the second workpiece and the first side of the first workpiece, wherein the non-ferrous metallic strip comprises at least one of copper, aluminum, gold, or silver, and wherein the non-ferrous metallic strip is a mesh;

locating an induction welding tool proximate the non-ferrous metallic strip; and locating a coil proximate a second side of the first workpiece, wherein the induction welding is at the welding region, and wherein the induction welding further comprises:

operating an induction welding tool at the welding region, wherein the induction welding tool comprises an induction welding tool surface; and energizing the coil proximate the first workpiece, wherein the coil is configured to energize with an electric current, wherein the energized coil is configured to generate an electromagnetic field that induces the electric current which heats the first workpiece and the second workpiece at the welding region, wherein the heat generated by the coil is configured to weld, by the induction welding tool, the second workpiece to the first workpiece at the welding region.

2. The method of claim 1, wherein the first thermoplastic composite structure further comprises a skin and wherein the skin is configured to weld to the second workpiece.

3. The method of claim 2, wherein the induction welding the first thermoplastic composite structure to the second workpiece further comprises induction welding the first thermoplastic composite structure to a stiffener.

4. The method of claim 3, wherein the induction welding the first thermoplastic composite structure to the stiffener further comprises the stiffener comprising:

a stiffener cap;

a stiffener web; and a stiffener flange, wherein the stiffener flange is configured to weld to the first thermoplastic composite structure.

5. The method of claim 4, wherein the induction welding the stiffener flange to the first thermoplastic composite structure further comprises the stiffener flange at least partially overlaying the skin of the first thermoplastic composite structure, wherein the stiffener flange is configured to weld to the skin of the first thermoplastic composite structure at the welding region.

6. The method of claim 5, wherein the induction welding the stiffener flange to the skin further comprises energizing the coil, wherein the coil is configured to generate the electromagnetic field, wherein the electromagnetic field is configured to induce the electric current which heats the stiffener flange and the skin at the welding region, wherein the heat generated by the coil is configured to weld, by the induction welding tool, the stiffener flange to the skin at the welding region.

7. A method of joining a first workpiece to a second workpiece, the method comprising:

induction welding the first workpiece to the second workpiece, wherein a first side of the second workpiece at least partially overlays a first side of the first workpiece, wherein the first workpiece is a first thermoplastic composite structure, wherein the second workpiece is a second thermoplastic composite structure, wherein a polymer tape at least partially overlays a second side of the second workpiece, wherein the polymer tape is disposed between the second side of the second workpiece and a non-ferrous metallic strip for conducting heat uniformly at a welding region between the first side of the second workpiece and the first side of the first workpiece, wherein the non-ferrous metallic strip comprising at least one of copper, aluminum, gold, and silver, wherein the metallic strip is a mesh, and wherein the induction welding is at the welding region, wherein the induction welding further comprises:

operating an induction welding tool at the welding region, wherein the induction welding tool comprises an induction welding tool surface, wherein the induction welding tool surface is located proximate the non-ferrous metallic strip; and energizing a coil located proximate a second side of the first workpiece, wherein the coil is configured to energize with an electric current, wherein the energized coil is configured to generate an electromagnetic field that induces the electric current which heats the first workpiece and the second workpiece at the welding region, wherein the heat generated by the coil is configured to weld, by the induction welding tool, the second workpiece to the first workpiece at the welding region; and removing the polymer tape from the second workpiece after induction welding.

8. The method of claim 7, wherein the first thermoplastic composite structure further comprises a skin and wherein the skin is configured to weld to the second workpiece.

9. The method of claim 8, wherein the induction welding the first thermoplastic composite structure to the second workpiece further comprises induction welding the first thermoplastic composite structure to a stiffener.

10. The method of claim 9, wherein the induction welding the thermoplastic composite structure to the stiffener further comprises the stiffener comprising:

a stiffener cap;

a stiffener web; and a stiffener flange, wherein the stiffener flange is configured to weld to the first thermoplastic composite structure.

11. The method of claim 10, wherein the induction welding the stiffener flange to the first thermoplastic composite structure further comprises the stiffener flange at least partially overlaying the skin of the first thermoplastic composite structure, wherein the stiffener flange is configured to weld to the skin of the first thermoplastic composite structure at the welding region.

12. The method of claim 11, wherein the induction welding the stiffener flange to the skin at the welding region further comprises disposing the polymer tape at the welding region, wherein the polymer tape at least partially overlays the stiffener flange.

13. The method of claim 12, wherein the induction welding the stiffener flange to the skin at the welding region further comprises energizing the coil, wherein the coil is configured to generate the electromagnetic field, wherein the electromagnetic field is configured to induce the electric current which heats the stiffener flange and the skin at the welding region, wherein the heat generated by the coil is configured to weld, by the induction welding tool, the stiffener flange to the skin at the welding region.

14. The method of claim 13, wherein the induction welding the stiffener flange to the skin at the welding region further comprises the non-ferrous metallic strip, wherein the mesh is fixed to the induction welding tool surface.

15. The method of claim 14, wherein the induction welding the stiffener flange to the skin at the welding region further comprises the polymer tape, wherein the polymer tape is disposed between the stiffener flange and the mesh, wherein the polymer tape is configured to be removed from the stiffener flange after induction welding.

16. An induction welding apparatus, the induction welding apparatus comprising:
   a first workpiece, wherein the first workpiece is a first thermoplastic composite structure;
   a second workpiece, wherein the second workpiece is a second thermoplastic composite structure and wherein a first side of the second workpiece at least partially overlays a first side of the first workpiece;
   an embedded non-ferrous metallic strip located proximate a second side of the second workpiece, wherein the non-ferrous metallic strip is configured to conduct heat uniformly at a welding region between the first side of the second workpiece and the first side of the first workpiece, wherein the non-ferrous metallic strip comprises at least one of copper, aluminum, gold, and silver, and wherein the embedded metallic strip is a mesh;
   an induction welding tool located proximate the non-ferrous metallic strip, wherein the induction welding tool comprises an induction welding tool surface; and
   a coil, wherein the coil is located proximate a second side of the first workpiece, wherein the coil is configured to energize with an electric current, wherein the energized coil is configured to generate an electromagnetic field that induces the electric current which heats the first workpiece and the second workpiece at the welding region, wherein the heat generated by the coil is configured to weld, by the induction welding tool, the second workpiece to the first workpiece at the welding region.

17. The induction welding apparatus of claim 16, wherein the first thermoplastic composite structure comprises a skin.

18. The induction welding apparatus of claim 17, wherein the second workpiece is a stiffener, wherein the stiffener further comprises:
   a stiffener cap;
   a stiffener web; and
   a stiffener flange,
   wherein the stiffener flange is at least partially overlaying the skin of the first thermoplastic composite structure.

19. The induction welding apparatus of claim 18, wherein the heat generated by the coil is configured to weld, by the induction welding tool, the stiffener flange to the skin of the first thermoplastic composite structure.

* * * * *